United States Patent [19]

Heichler

[11] Patent Number: 5,182,745
[45] Date of Patent: Jan. 26, 1993

[54] DATA TRANSMISSION METHOD AND ARRANGEMENT

[75] Inventor: Johannes Heichler, Murrhardt, Fed. Rep. of Germany

[73] Assignee: ANT Nachrichtentechnik GmbH, Backnang, Fed. Rep. of Germany

[21] Appl. No.: 605,488

[22] Filed: Oct. 30, 1990

[30] Foreign Application Priority Data

Nov. 14, 1989 [DE] Fed. Rep. of Germany ....... 3937814

[51] Int. Cl.$^5$ .......................... H04L 5/14; H04J 3/02
[52] U.S. Cl. ..................................... 370/85.1; 375/36; 375/7; 370/31; 370/27; 370/24
[58] Field of Search ..................... 370/85.1, 24, 27, 32, 370/31; 375/7, 8, 36; 307/270

[56] References Cited

U.S. PATENT DOCUMENTS

| | | | |
|---|---|---|---|
| 4,445,222 | 4/1984 | Smitt | 375/36 |
| 4,742,309 | 5/1988 | Chu | 375/36 |

FOREIGN PATENT DOCUMENTS

| | | |
|---|---|---|
| 0364700 | 4/1990 | European Pat. Off. . |
| 2953275 | 5/1980 | Fed. Rep. of Germany . |
| 3433150 | 3/1986 | Fed. Rep. of Germany . |

OTHER PUBLICATIONS

B. Wiemann et al.; *Bussysteme*; rtp-Seminar; pp. S61 to S64; Aug. 1983.
B. Wiemann et al.; *Bussysteme*; rtp-Seminar; pp. S69 to S70; Oct. 1983.
National Semiconductor; *FACT Advanced CMOS Logic Databook*; pp. 5-121 to 5-124; 1987.

*Primary Examiner*—Douglas W. Olms
*Assistant Examiner*—Wellington Chin
*Attorney, Agent, or Firm*—Spencer, Frank & Schneider

[57] ABSTRACT

For the transmission of data in the form of difference signals between subscribers connected to a bus, bus couplers are provided which permit switching between transmit and receive operation. The bus couplers each include a multiplexer connected in such a manner that, for receive operation, only push-pull states of the difference signal are evaluated. If common-mode states occur, the immediately previously decoded data are used. In the case of interference, e.g. one subscriber experiences a short circuit, his bus is terminated passively so that the bus traffic for the other subscribers is not adversely affected.

15 Claims, 4 Drawing Sheets

DATA TRANSMISSION METHOD AND ARRANGEMENT

This application claims the priority of Application Serial Number DE P 39 37 814.4, filed on Nov. 14, 1989 in the Federal Republic of Germany, the subject matter of which is incorporated herein by reference.

BACKGROUND OF THE INVENTION

1. Field of the Invention

The present invention relates to a method of transmitting data in the form of difference signals between subscribers which are in communication with one another by way of a bus, and an arrangement for carrying out the method.

2. Background Information

One such method and arrangement is disclosed in DE 2,953,275.C2 and corresponding U.S. Pat. No. 4,445,222. Data transmitting devices are electrically isolated by means of bus couplers and are switched to bus lines. The transmission of the data on the bus takes place, as disclosed in U.S. Pat. No. 4,445,222, in the form of difference signals.

Bus coupling circuits in bus receivers provided with hysteresis circuits are disclosed in the publication, entitled "Regelungstechnische Praxis" (Control Technology in Practice), Volume 25, 1983, No. 10, pages S61–S64 and pages S69–S70. The hysteresis circuits there serve to suppress superimposed interference, or noise, signals.

DE 3,433,150.A1 discloses a subscriber circuit for coupling a subscriber to a bus. Measures are taken there to make sure all subscribers are protected from short circuits at the interface.

In EP 89,115,672.1, corresponding to U.S. Pat. No. 4,985,903, it is proposed to create a bus coupling circuit with fault tolerance for the transmission of unipolar signals by providing each bus driver with an additional hysteresis circuit in order to re-introduce a d.c. voltage value at the point free of direct current where the bus driver is coupled to the bus.

SUMMARY OF THE INVENTION

It is an object of the present invention to introduce fault tolerance into the transmission of data in the form of difference signals between multiple subscribers on a bus and to provide an arrangement for carrying out the method.

The above object is accomplished with respect to the method by: providing a multiplexer for each subscriber as a bus decoder for data evaluation with the multiplexer having address inputs, for receiving data, coupled to the lines of the data bus via d.c. blocking circuitry switching the multiplexer between transmit and receive modes of operation by means of a control signal during the receive mode of operation, decoding only different-mode-states of data on the bus as logic levels and using an immediately previously decoded logic level for a common mode state of data on the bus; and establishing a d.c. bias voltage at the address inputs of the multiplexer during the receive mode of operation by a feed back hysteresis connection between the outputs of the multiplexer and the address inputs. According to the preferred embodiment of the invention the step of using an immediately previously decoded logic level includes feeding back an output signal of the multiplexer to the data inputs of the multiplexer corresponding to the binary common mode states; and the feedback of the output signal to the data inputs of the multiplexer is caused to be ineffective during the transmit mode of operation.

According to further features of the invention each multiplexer is provided with a bus termination via resistors whose combined value corresponds to the characteristic impedance of the bus line, and the bias of the address inputs of the multiplexer receiving the data on the bus is set to be slightly below the response threshold of the address inputs.

The above object is generally achieved with regard to the apparatus by an arrangement for transmitting and receiving data, which is in the form of difference signals, between a plurality of subscribers which are in communication with one another via a data bus, and wherein each subscriber is connected to the data bus via a circuit for decoding received data on the bus; and wherein each of these circuits comprises: a multiplexer having a plurality of binary code ranked data inputs, a plurality of address inputs, and first and second data outputs; first means for connecting first and second of the address inputs to respective lines of the bus in a d.c. blocking manner; second means for applying a logic level control signal to a further of the address inputs to 10 switch the multiplexer between a receive mode of operation, wherein only a first group of data inputs are addressable by data signals at the first and second address inputs, and a transmit mode of operation, wherein only a second group of data inputs are addressable by data signals at the first and second address inputs; third means connecting the second group of data inputs together to receive data from a subscriber which are to be transmitted; fourth means, connected to the first group of data inputs, for causing the multiplexer to decode only different-mode-states of data received from the data bus via the first and second address inputs as logic levels, and for using an immediately previously decoded logic level for common mode states of data received from the data bus via the first and second address inputs; and hysteresis circuit means, connected between the outputs and the first and second address inputs of the multiplexer, and responsive to output signal levels at the outputs during a receive mode of operation, for establishing a d.c. bias voltage at the first and second address inputs.

The measures according to the present invention have the following advantages:

A defined potential is made available to the subscribers during the transmission pauses, permitting the linkage of start-stop-bit operation (quasi-asynchronous processor operation) with parallel-bus operation. The toleration of a predeterminable number (TBD—to be determined) of subscriber short circuits including their bus couplers is possible without noticeably interfering with operation between the remaining subscribers via the bus. Due to the use of binary common-mode (in-phase) rejection, it is possible to employ conventional CMOS modules in FACT technology (Fairchild Advanced CMOS Technology) for example, as bus decoders in the form of multiplexers.

Advantageously, common-mode interference is suppressed. The two-wire difference transmission is here understood to be an error correction code which suppresses common-mode states and transmits different-mode-states without distortion. The measures according to the present invention automatically provide bus termination, being also an "electrostatic bus grounding".

One embodiment of the invention will be described in greater detail with reference to the drawing figures.

DETAILED DESCRIPTION OF THE PREFERRED EMBODIMENT

Figure 1:
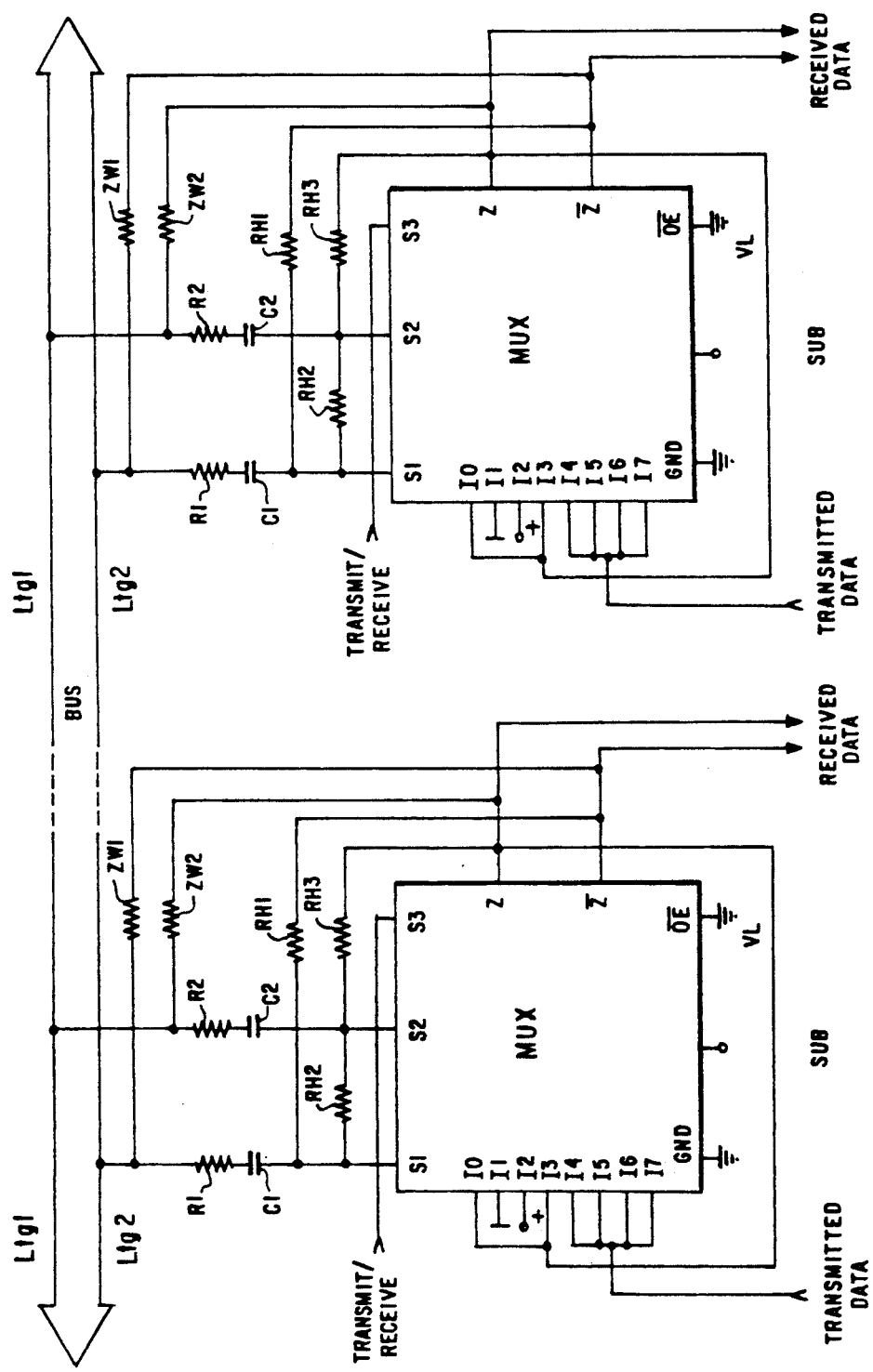
FIG. 1 is a circuit diagram of a bus coupler according to the present invention.

FIG. 1 shows the subscriber interface bus couplers between two subscribers "SUB" and the bus (BUS). A greater plurality of such subscribers can be connected to the bus, each operating as data transmitter and/or data receiver for the exchange of data. The data are transmitted by means of difference signals as predominantly employed in extensive line systems because of their freedom from induction loops. A commercially available multiplexer (MUX), e.g. an AC 251 in CMOS-FACT technology, is employed in the bus coupler. Due to the special interconnections according to the invention, this bus coupler meets all operational requirements, particularly with respect to fault tolerance.

The two bus lines Ltg 1 and Ltg 2 each are coupled to a respective one of the two address inputs S1 and S2 of the multiplexer MUX in a galvanically (electrically) separated, i.e., d.c. blocking, manner by way of respective isolating capacitors C1 and C2 and series resistors R1 and R2. The data inputs are marked I0 to I7 and the data outputs are marked Z and $\overline{Z}$ for the non-inverted and inverted output signals respectively. By way of address input S3, switching between transmit and receive modes of operation of the multiplexer can be made. In the transmitting mode of operation, multiplexer MUX switches the data supplied by a subscriber via inputs I4 to I7 onto the bus via respective resistances ZW1 and ZW2 connected to the outputs. In the receiving mode of operation, the multiplexer MUX receives the data on the bus via address inputs S1 and S2. Depending on the polarity of the signals in lines Ltg1 and Ltg2 of the bus, multiplexer MUX decodes, in a manner to be described below, which signals are to be evaluated as received data.

In the transmit operational mode, a logic H (high) signal is applied to address input S3. The multiplexer inputs I4 to I7, which are all connected together and receive the data to be transmitted, are then switched to the bus. It does not matter what potentials the other address inputs I0–I3 have ("don't care" state).

Multiplexer MUX has the following truth table:

| S3 | S2 | S1 | Z |
|----|----|----|----|
| L | L | L | I0 |
| L | L | H | I1 |
| L | H | L | I2 |
| L | H | H | I3 |
| H | L | L | I4 |
| H | L | H | I5 |

-continued

| S3 | S2 | S1 | Z |
|----|----|----|----|
| H | H | L | I6 |
| H | H | H | I7 |

Multiplexer input I1 is connected to ground ("L" low potential) while input I2 carries a positive voltage ("H" high potential). Inputs I0 and I3 are each connected with data output Z. With this type of connection, and the truth table of multiplexer MUX above, only the different-mode-states of the bus signal at address inputs S1 and S2 are decoded as fixed logic levels (multiplexer inputs I1 and I2) in receive operational mode (when address input S3 carries a logic L signal), while for common-mode states (multiplexer inputs I0 and I3), the last, previous, logic levels are used as a result of the signal feedback through connecting line VL from data output Z of multiplexer MUX to the inputs I0 and I3 whose binary coded ranking corresponds to the common-mode states 00 and 11. Thus, common-mode interference is always returned to the previous level and thus suppressed. However, the signal feedback is effective only in the receive operational mode. In the transmit operational mode, it is suppressed because the presence of an H potential at address input S3 permits only signals at inputs I4 to I7 to be effectively switched through.

Address inputs S1 and S2 are biased by hysteresis resistors RH1, RH2 and RH3. These hysteresis resistors RH1, RH2 and RH3 are arranged as follows: hysteresis resistor RH1 is connected between address input S1 and the $\overline{Z}$ data output of multiplexer MUX; hysteresis resistor RH2 is connected between address inputs S1 and S2; and hysteresis resistor RH3 lies between address input S2 and the Z data output. The bias at address inputs S1 and S2 is generated by the voltage drops across hysteresis resistors RH1, RH2 and RH3.

The d.c. voltage values lost due to the d.c. voltage electrical blocking or isolation (capacitors C1, C2) are thus re-introduced in the form of a d.c. bias at address inputs S1 and S2. This re-introduction of the d.c. voltage values is important to achieve fault tolerance, as will be described further below.

A signal edge having a difference character (a positive edge at one input and a negative edge at the other input) is thus fed back via the hysteresis resistors.

The following operation results:

With the bus system completely intact (no short circuits or interruptions at the subscribers and in the bus couplers) and in the transmit operational mode, the transmitted data from one subscriber are switched via his multiplexer MUX from inputs I4 to I7 to outputs Z and $\overline{Z}$, respectively, and fed to the bus via resistors ZW1 and ZW2 which are each connected between a respective data output Z or $\overline{Z}$ and a respective bus line Ltg1 or Ltg2. If multiplexer MUX is short-circuited at data outputs Z and $\overline{Z}$, the bus is thus passively terminated by resistors ZW1 and ZW2. These resistors ZW1 and ZW2 are advantageously selected so that their combined resistance is equal to the characteristic impedance of the bus, e.g. 100 ohm. If there is a short circuit at address inputs S1 and S2, the bus is terminated by resistors R1, R2 and ZW1, ZW2. Thus, there exists complete fault tolerance; that is, a fault at a subscriber or his bus coupler does not lead to interference in the operation of other subscribers using the bus.

Figure 2:
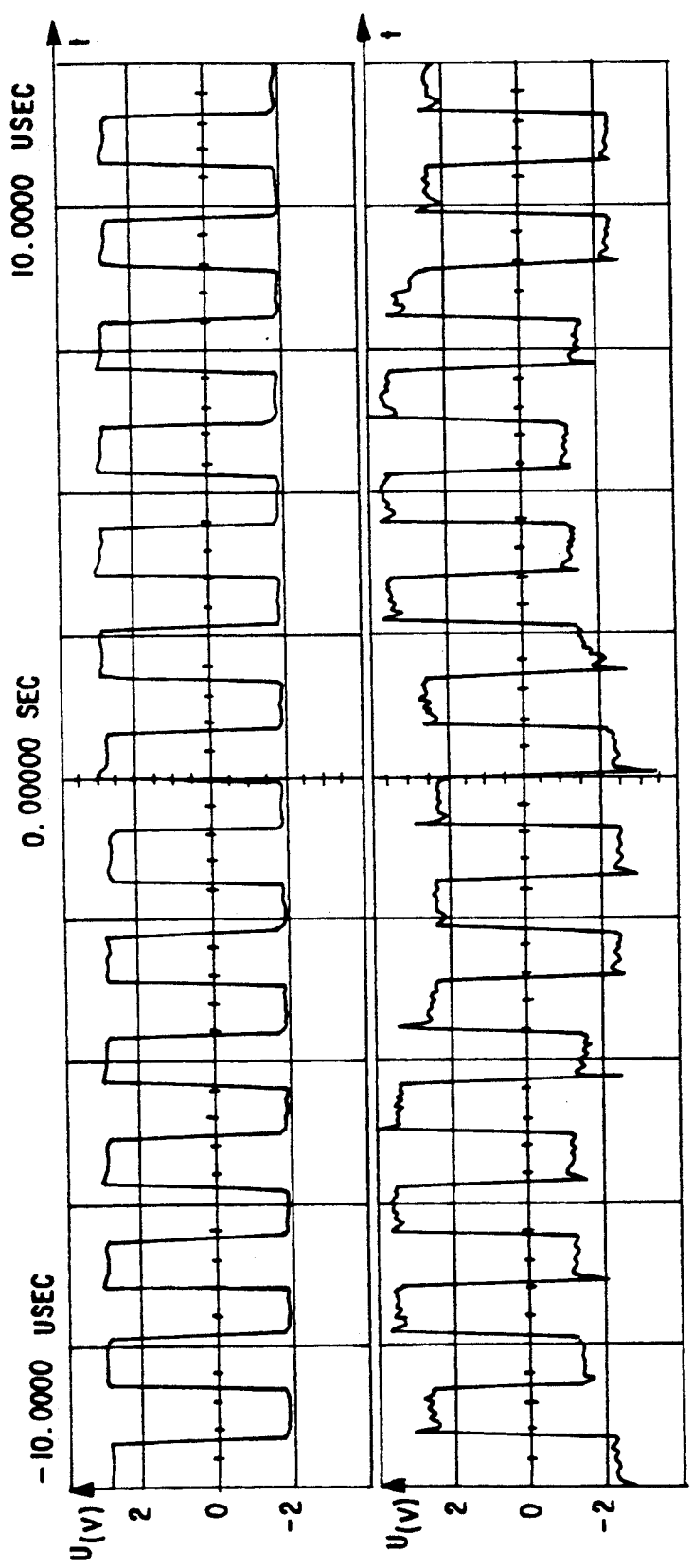
FIG. 2 is a voltage timing diagram for a received data signal and its signal shape on the bus with a superimposed interference.
Figure 3:
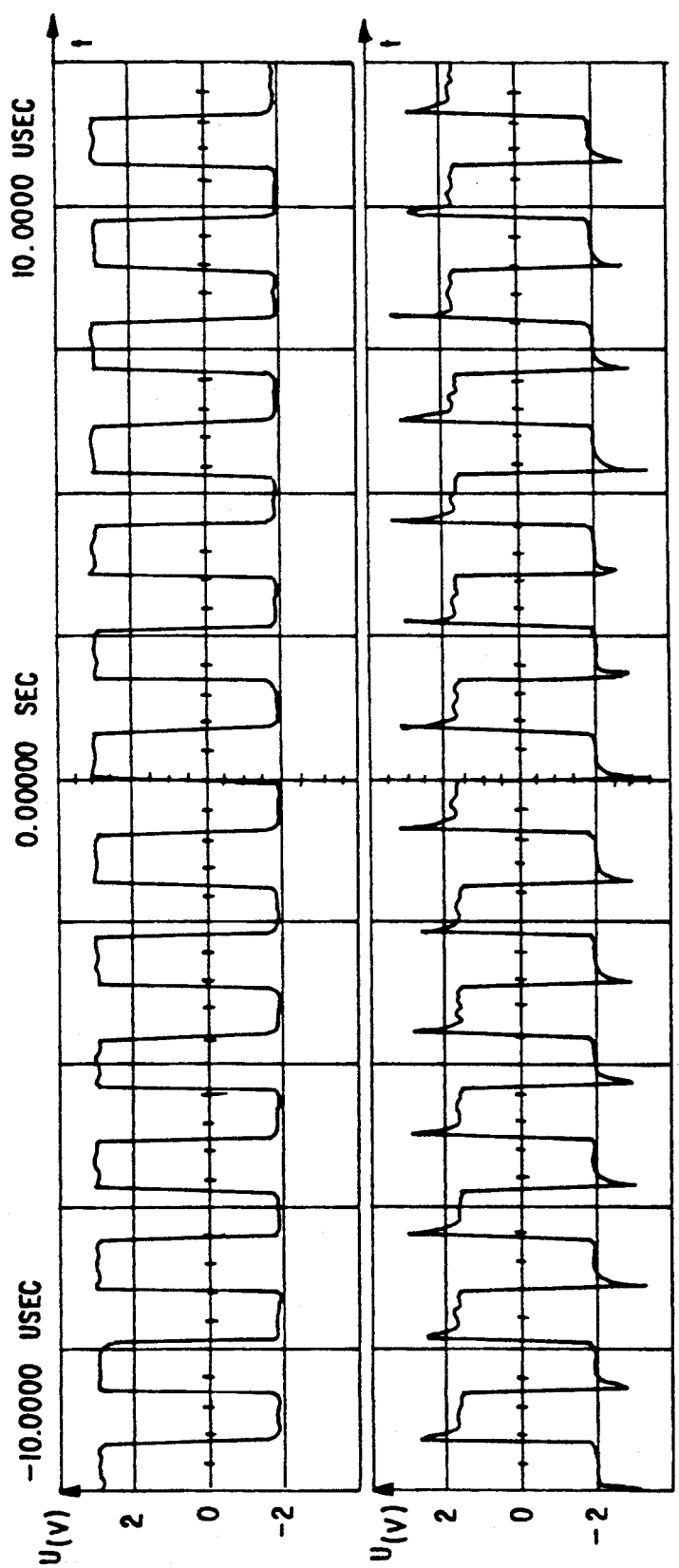
FIG. 3 is a voltage timing diagram for a received data signal and its signal shape on the bus upon the occurrence of a short circuit at a subscriber station.
Figure 4:
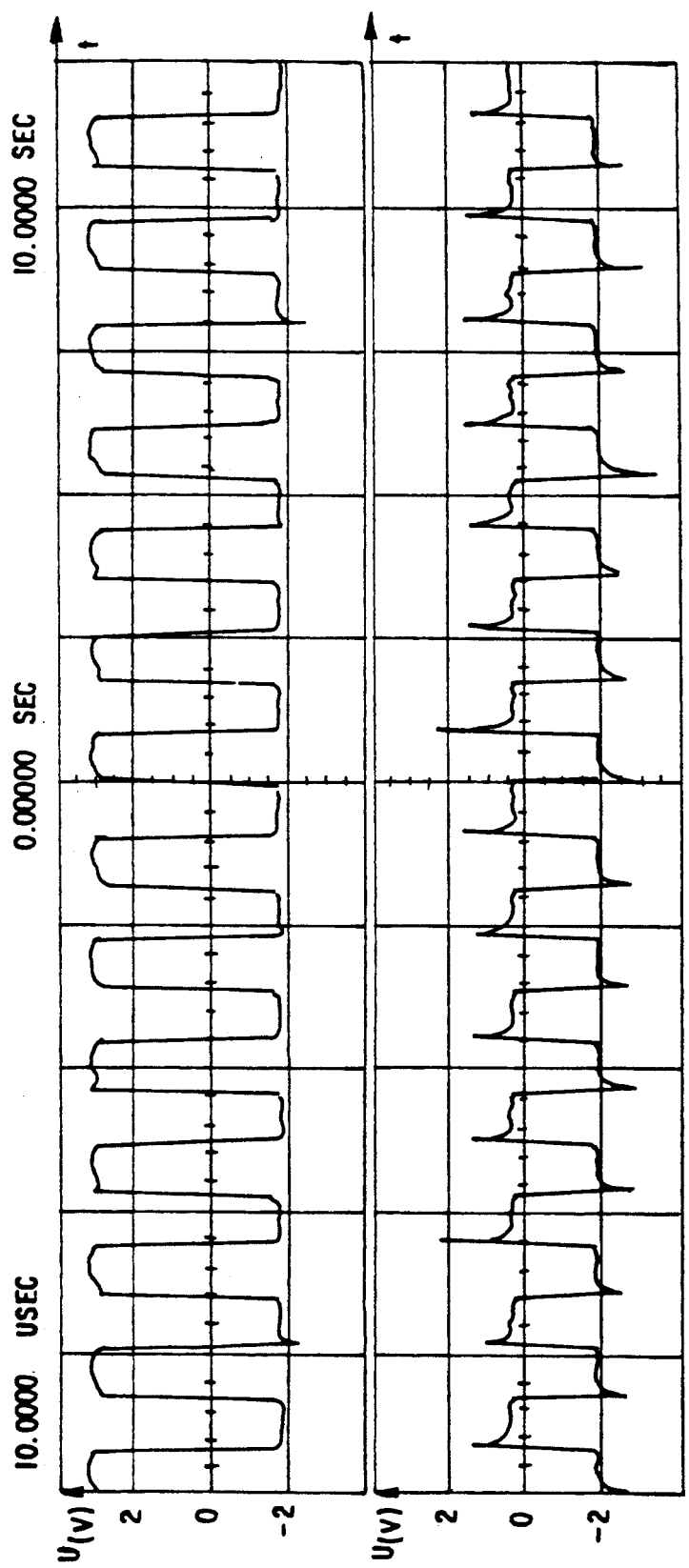
FIG. 4 is a voltage timing diagram for a received data signal and its signal shape on the bus upon the occurrence of short circuits at two subscriber stations.

FIGS. 2 to 4 show the voltage curves over time for a received data signal (the respective upper signal) and the signal shape resulting on the bus from the transmitted signal if interference is present (the lower signal in each case). In the case of FIG. 2, a superimposed interference exists in the form of a 100 kHz rectangular signal. In the case of FIG. 3, a subscriber or, more precisely, his bus coupler, 0 has encountered a short circuit, and in FIG. 4, two subscribers or, more precisely, their respective bus couplers, have encountered short circuits simultaneously. As evident in FIGS. 3 and 4, the signal amplitude on the bus decreases with an increasing number of short-circuit occurrences, since for n short circuits the bus is terminated by n parallel connections of respective resistances ZW1 and ZW2. The selection of the bias for address inputs S1 and S2 must be adapted accordingly in order to realize greater fault tolerance. If the bias is selected by appropriate dimensioning of the hysteresis resistors RH1–RH3 to be slightly below the response threshold of the address inputs of multiplexer MUX, a reliable decision can still be made in all illustrated cases as to which type of data (0 or 1 states) were transmitted. The following applies for the dimensioning of the resistors:

Initially, an important requirement is that the resistance of the hysteresis resistors RH1 to RH3 should be significantly greater than resistors R1, R2, ZW1, ZW2. This somewhat simplifies matters and lightens the load for the drivers. A further simplification of the situation is brought about by the fact that the MUX components are not true difference drivers or receivers but normal FACT gate networks. Thus, it is possible to consider the outputs and inputs of the multiplexer to be of standard-logic-manner. Only the logic linkage makes the circuit a difference stage. This then operates as follows:

A driver presently transmitting impresses a different-mode voltage at the driving impedance Zw (Zw1=ZW2) onto the bus. For k subscribers the existing load is:

$$Z1 = Zw/k.$$

Resistors RH1 to RH3 are neglected because of their high resistance values, as already mentioned. The equation results because at the first moment of switching, the end of each impedance Zw remote from the bus is connected to an output of the receiver (Z, $\overline{Z}$). The latter is set (FACT) to the ideal of 0 ohm. Thus, the voltage swing at the inputs S1 and S2, respectively, is as follows (line effects are neglected here):

$$U(S1,2) = 5 \text{ V}.(Zw/k) \div (Zw/k + Zw)$$

or $U(S1,2) = 5 \text{ V}.1/(k+1)$ where 5 V is the supply voltage for the respective multiplexers MUX.

Thus, the voltage swing is determined only by the number of subscribers. The more subscribers, the smaller the voltage swing becomes, so that this number also limits the system.

The set hysteresis value must be dimensioned correspondingly. Of course this voltage swing must exceed the hysteresis since otherwise the receivers would never be able to switch and would thus be unable to "assist". Therefore, the exponential drop of the capacitor voltages at the input from a preceding event must settle at no more than:

$$Uhs1+ = 5$$
$$V.(RH2+RH3) \div (RH1+RH2+RH3)-2.5$$
$$V \leq U(S1)$$

and $$Uhs2+ = 5$$
$$V.(RH2+RH1) \div (RH1+RH2+RH3)-2.5$$
$$V \leq U(S1)$$

above the 2.5 V threshold, depending on which input happens to receive the "HIGH" signal. The same applies correspondingly for the "LOW" signal as is easily understood on the basis of symmetry considerations.

The following then applies:

$$Uhs1- = 2.5 \text{ V} - 5 \text{ V}.(RH1) \div (RH1+RH2+RH3)$$

and $$Uhs2- = 2.5 \text{ V} - 5 \text{ V}.(RH3) \div (RH1+RH2+RH3)$$

below the 2.5 V threshold. (By equating Uhs1+ and Uhs1− as well as Uhs2+ and Uhs2− it can easily be proven that this equality and thus the symmetry of the hysteresis is actually the case.) As long as these hysteresis, as already mentioned, are still traversed in differential manner, the receiver will respond.

If short circuits occur, it depends on whether these occur at the outputs Z, $\overline{Z}$ or at address inputs S1, S2 of multiplexer MUX and both cases must be considered. In the case that one of the outputs Z, $\overline{Z}$ short-circuits, nothing changes in the edge voltage on the bus because the transmitter continues to "see" the above-calculated load. The only thing different is that the assistance after exceeding the threshold no longer occurs which, however, is not critical since the switching process is then already completed. If, however, a short circuit occurs at one of the address inputs S1 or S2, this load is connected in parallel with the respective resistors R1, R2. However, for the sake of speed, the resistance of these resistors R1, R2 cannot be selected to be too large. The order of magnitude in any case must be Zw. Thus for n short circuits the load for the transmitter is calculated as follows:

$$Z1 = 1/(k/Zw+n/R).$$

In that case, because of the voltage splitting, and by substituting this new value of Z1 into the previous equation for U(S1,2), the voltage at the address input (S1,S2) becomes the following:

$$U(S1,2) = 5 \text{ V}.[1/(1+k+nZw/R)]$$

The previous or old value of U(S1,2), which includes only the number of subscribers, then results for n=0.

The number of tolerable short circuits now again depends on the value to which the voltage across the receiver input is permitted to drop; that is, the value of the hysteresis voltage (Uh) which, however, is the following:

$$Uhs1+ = 5$$
$$V.(RH2+RH3) \div (RH1+RH2+RH3)-2.5 \text{ V}$$

Now symmetry can again be presumed to exist without limiting general applicability, that is, the pure hysteresis voltage amount can be used with $RH1=RH3=Rh$ and $RH2=Rhd$:

$$Uh=5\ V.(Rhd+Rh)\div(2Rh+Rhd)-2.5\ V\ ]$$

And, with $Uh \leq U(S1,2)$, a solution toward n brings the following:

$$n \leq R/Zw.[4Rh/Rhd-(k-1)]$$

for the tolerable number of short circuits. As can be seen, R (the resistance ahead of the capacitor) is included in the fault tolerance. For one specific embodiment, the following dimensions applies:

$$R=Zw;\ Rh/Rhd=7;\ k=8$$

so that theoretically $n=21$ is permissible; that is, a value far above the number of subscribers. The reasons for this high fault tolerance are the following:
  (a) the large dimensions of Rh/Rhd (the hysteresis was only about 0.35 volt) which is affordable due to the binary common-mode suppression;
  (b) the fact that the here calculated worst case of an input short circuit is much less frequent than the short circuit of an output. But then no increased load acts on the transmitter. More short circuits than subscribers can happen only if one subscriber has several defects simultaneously. That case is even rarer.

With difference signal transmission, the high signal to noise ratio permits a very low hysteresis setting. Because of the binary common-mode suppression, it does not matter at all if peaks go through it.

The measures according to the present invention allow a quasi-asynchronous-start-stop-bit operation. Due to the signal feedback from the Z output to the I0/I3 inputs, one stop bit remains in the bus "memory" during the "guard time".

It will be understood that the above description of the present invention is susceptible to various modifications, changes, and adaptations, and the same are intended to be comprehended within the meaning and range of equivalents of the appended claims.

What is claimed is:

1. A method of transmitting and receiving data which is in the form of difference signals, between subscribers which are in communication with one another via a data bus, comprising the steps of:
   providing a multiplexer for each subscriber as a bus decoder for data evaluation with the multiplexer having select inputs, for receiving data, coupled to the lines of the data bus via d.c. blocking circuitry;
   switching the multiplexer between transmit and receive modes of operation by means of a control signal;
   during the receive mode of operation, decoding only different-mode-states of data on the bus as logic levels and using an immediately previously decoded logic level for a common mode state of data on the bus; and
   establishing a d.c. bias voltage at the select inputs of the multiplexer during the receive mode of operation by a feed back hysteresis connection between outputs of the multiplexer and the select inputs.

2. A method as defined in claim 1, wherein said step of using an immediately previously decoded logic level includes feeding back an output signal of the multiplexer to data inputs of the multiplexer corresponding to the binary common mode states; and further comprising causing the feed-back of the output signal to the data inputs of the multiplexer to be ineffective during the transmit mode of operation.

3. A method as defined in claim 1, further comprising providing each multiplexer with a bus termination via resistors whose combined value corresponds to the characteristic impedance of the bus line.

4. A method as defined in claim 1, wherein said step of establishing a d.c. bias voltage includes setting a bias of the select inputs of the multiplexer receiving the data on the bus to be slightly below or above a response threshold of the select inputs.

5. In an arrangement for transmitting and receiving data, which is in the form of difference signals, between a plurality of subscribers which are in communication with one another via a data bus having lines, and wherein each subscriber is connected to said data bus via a circuit for decoding received data on said bus; the improvement wherein each said circuit comprises:
   a multiplexer having a plurality of binary code ranked data inputs, a plurality of select inputs, and first and second data outputs;
   first means for connecting first and second of said select inputs to respective lines of said bus in a d.c. blocking manner;
   second means for applying a logic level control signal to a further of said select inputs to switch said multiplexer between a receive mode of operation, wherein only a first group of said data inputs are selectable by data signals at said first and second select inputs, and a transmit mode of operation, wherein only a second group of said data inputs are selectable by data signals at said first and second select inputs;
   third means connecting said second group of data inputs together to receive data from a subscriber which are to be transmitted;
   fourth means, connected to said first group of data inputs, for causing said multiplexer to decode only different-mode-states of data received from said data bus via said first and second select inputs as logic levels, and for using an immediately previously decoded logic level of common mode states of data received from said data bus via said first and second select inputs; and
   hysteresis circuit means, connected between said first and second outputs and said first and second select inputs of said multiplexer and responsive to output signal levels at said first and second outputs during a receive mode of operation, for establishing a d.c. bias voltage at said first and second select inputs.

6. An arrangement as defined in claim 5 further comprising fifth circuit means for connecting each of said first and second outputs of said multiplexer to a respective said line of said bus.

7. An arrangement as defined in claim 6 wherein said fifth circuit means comprises first and second resistors which are each connected between a respective one of said first and second outputs and a respective one of said lines of said bus, and whose combined resistance value corresponds to the characteristic impedance of said bus.

8. An arrangement as defined in claim 7 wherein said fourth means comprises:
   a feedback connection between said first output of said multiplexer and each input of said first group of inputs whose binary code ranking corresponds to one of said commonmode states; and connections between respective further ones of said first group of data inputs and respective logic high level and logic low level voltages.

9. An arrangement as defined in claim 8 wherein said hysteresis circuit means comprises first, second and third hysteresis resistors, with said first hysteresis resistor being connected between said first and second select inputs, and said second and third hysteresis resistors each being connected between a respective one of said first and second outputs and a respective one of said first and second select inputs.

10. An arrangement as defined in claim 9 wherein said hysteresis resistors have values such as to set said d.c. bias voltage at said first and second select inputs to be slightly below a response threshold of said multiplexer at said select inputs.

11. An arrangement as defined in claim 9 wherein said first means includes first and second capacitors each connected between a respective one of said first and second select inputs and a respective one of said lines of said bus.

12. An arrangement as defined in claim 5 wherein said first means includes first and second capacitors each connected between a respective one of said first and second select inputs and a respective one of said lines of said bus.

13. An arrangement as defined in claim 5 wherein said fourth means comprises:

a feedback connection between said first output of said multiplexer and each input of said first group of inputs whose binary code ranking corresponds to one of said commonmode states; and connections between respective further ones of said first group of data inputs and respective logic high level and logic low level voltages.

14. An arrangement as defined in claim 5 wherein said hysteresis circuit means comprises first, second and third hysteresis resistors, with said first hysteresis resistor being connected between said first an second select inputs, and said second and third hysteresis resistor each being connected between a respective one of said first and second outputs and a respective one of said first and second select inputs.

15. An arrangement as defined in claim 5 wherein said hysteresis circuit means sets said d.c. bias voltage at said first and second select inputs to be slightly below or above a response threshold of said multiplexer at said select inputs.

* * * * *